United States Patent
Yep et al.

(10) Patent No.: US 10,194,283 B1
(45) Date of Patent: Jan. 29, 2019

(54) METHOD FOR CONTROLLING A PORTABLE RADIO COMMUNICATION DEVICE TO PARTICIPATE IN A TALK GROUP CALL

(71) Applicant: MOTOROLA SOLUTIONS, INC, Chicago, IL (US)

(72) Inventors: Mun Chun Yep, Georgetown (MY); Lau Karn Jye, Bukit Mertajam (MY); Chang How Tan, Bayan Lepas (MY); Choo Enn Tay, Bagan Serai (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/956,783

(22) Filed: Apr. 19, 2018

(51) Int. Cl.
*H04W 4/10* (2009.01)
*H04W 4/80* (2018.01)
*H04W 8/22* (2009.01)
*H04L 9/06* (2006.01)
*H04W 76/45* (2018.01)

(52) U.S. Cl.
CPC ............ *H04W 4/10* (2013.01); *H04L 9/0643* (2013.01); *H04W 4/80* (2018.02); *H04W 8/22* (2013.01); *H04W 76/45* (2018.02)

(58) Field of Classification Search
CPC ........... H04W 4/08–4/90; H04W 8/22; H04W 76/45; H04L 9/0643
See application file for complete search history.

(56) References Cited

U.S. PATENT DOCUMENTS

| 6,999,783 | B2 | 2/2006 | Toyryla et al. |
| 9,693,211 | B2 | 6/2017 | Igumnov et al. |
| 2014/0057645 | A1 | 2/2014 | Chowdhary et al. |
| 2017/0294131 | A1 | 10/2017 | Jedrzejewski et al. |

*Primary Examiner* — Raymond S Dean (57) ABSTRACT

A method of controlling a portable radio communication device to participate in a talk group call. The method includes receiving, at the portable radio communication device, a signal including a first hash value transmitted by at least one other portable radio communication device; selecting a wireless access point that is within a communication range of the portable radio communication device; applying a hash function to a device identifier that is uniquely associated with the wireless access point to generate a second hash value; comparing the first hash value with the second hash value; and controlling the portable radio communication device to participate in a talk group call with the at least one other portable radio communication device when the first hash value matches with the second hash value.

20 Claims, 5 Drawing Sheets

METHOD FOR CONTROLLING A PORTABLE RADIO COMMUNICATION DEVICE TO PARTICIPATE IN A TALK GROUP CALL

BACKGROUND OF THE INVENTION

Portable two-way radios and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Portable radios are often affiliated to different communication groups (also referred to as talk groups) to perform group communication. Group communication functionality allows a radio (also referred to as a talk group member) to simultaneously communicate with multiple other devices that are associated with the same communication group. In communication devices such as land mobile radios, a push to talk (PTT) interface is implemented to allow a user of the radio to press the push to talk interface to transmit audio on one or more communication channels (which may include a talk group channel or a private channel) for reception by multiple users associated with the talk group or for reception by a single user, respectively.

In some communication systems, portable radios are configured to unmute communications received from transmitting portable radios only after establishing that transmitting portable radios are associated with the same talk group and further located within the same proximity or vicinity. However, in emergency situations, it is possible for radios to be deployed in a location where there is no central server to act as a radio network controller to co-ordinate and control the communications between the radios. In addition, for security reasons, location tracking function may be disabled in some radios, or radios are sometimes pre-programmed to not exchange location data with each other. Therefore, radios may not be able to establish if other radios are in the same vicinity in such situations when there is no central server or when location tracking is disabled or when radios are pre-programmed to not exchange location data with each other. Further, it is also possible that the radios may be out of sensor range of each other and therefore cannot broadcast location data with each other to establish the vicinity. Even in cases where radios are within the communication range of each other, the radio channel may be congested due to radios exchanging signals with each other in an attempt to establish the vicinity.

In some locations, wireless access points are deployed to allow communication devices that are located within a hotspot region of the wireless access point to avail communication services such as internet. In such locations, radios may be able to detect wireless signals transmitted by such wireless access points. However, radios may not have access to a map that indicates the co-ordinates of the wireless access points and therefore radios cannot determine vicinity/proximity information using signals transmitted by such wireless access points. Therefore, the above scenarios may prevent the radios from determining vicinity/proximity information associated with other radios. This in turn prevents the radios from participating in a talk group call or accessing voice traffic originating from other radios with the same talk group or different talk group.

Disclosed is an improved method for controlling a portable radio communication device to participate in a talk group call. The improved method allows the radios to establish proximity or vicinity information associated with other radios prior to participating in the talk group call.

One embodiment provides a method of controlling a portable radio communication device to participate in a talk group call. The method includes receiving, at the portable radio communication device, a signal including a first hash value transmitted by at least one other portable radio communication device; selecting a wireless access point that is within a communication range of the portable radio communication device; applying a hash function to a device identifier that is uniquely associated with the wireless access point to generate a second hash value; comparing the first hash value with the second hash value; and controlling the portable radio communication device to participate in a talk group call with the at least one other portable radio communication device when the first hash value matches with the second hash value.

Another embodiment provides a portable radio communication device, including a wireless transceiver; and an electronic processor communicatively coupled to the wireless transceiver. The electronic processor is configured to receive, via the wireless transceiver, a signal including a first hash value transmitted by at least one other portable radio communication device; select a wireless access point from a plurality of wireless access points that are within a communication range of the portable radio communication device; apply a hash function to a device identifier that is uniquely associated with the wireless access point to generate a second hash value; compare the first hash value with the second hash value; and control the portable radio communication device to participate in a talk group call with the at least one other portable radio communication device when the first hash value matches with the second hash value.

Figure 1:
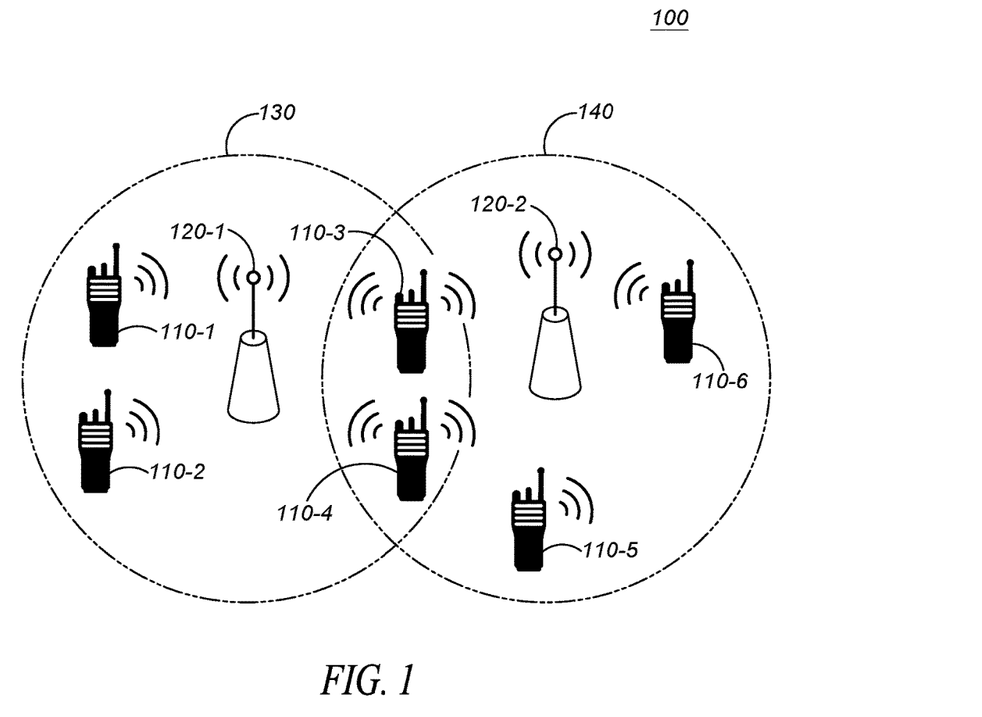
FIG. 1 is a block diagram of a communication system, in accordance with some embodiments.

Referring now to the drawings, and in particular FIG. 1, a communication system 100 is shown including a plurality of portable radio communication devices 110-1, 110-2, 110-3, 110-4, 110-5, 110-6 and a plurality of wireless access points 120-1 and 120-2. The plurality of portable radio communication devices 110-1 through 110-6 can be interchangeably referred to, collectively, as portable radio communication devices or communication devices or devices 110, and generically as a portable radio communication device or communication device or device 110. The plurality of wireless access points 120-1 through 120-2 can be interchangeably referred to, collectively, as wireless access points or access points 120, and generically as a wireless access point or access point 120. Although FIG. 1 illustrates only six portable radio communication devices 110 and two wireless access points 120, the communication system 100 may include any number of portable radio communication devices 110 and wireless access points 120.

The portable radio communication device 110 may be operated by users, who may carry or wear the respective communication devices, such as a battery-powered portable radio used for narrowband and/or broadband direct-mode or infrastructure communications, a battery-powered radio speaker microphone (RSM) video capture device, a laptop having an integrated video camera and used for data applications such as incident support applications, smart glasses which may be virtual reality, augmented reality, or mixed reality glasses, wearable communication devices, mobile phones, and vehicular radios. Each portable radio communication device 110 may include one or more wireless communication interfaces for communicating with a base station (not shown) or wireless access point 120 and/or directly with one or more other portable radio communication devices 110 in the system 100.

The portable radio communication device 110 may be associated with or subscribed to one or more talk groups to perform group communication. In accordance with some embodiments, the portable radio communication devices 110 communicate with one or more other portable radio communications devices 110 on a common operating channel using a direct mode of operation (DMO). As used herein, the term "direct mode of operation" refers to a mode of operation where portable radio communication devices 110 communicate directly with one another, independent of larger communication network and without sending communications through a gateway or a central server. In accordance with some embodiments, the portable radio communication devices 110 use direct mode of operation to communicate with one or more other portable radio communication devices 110. For example, the portable radio communication device 110-1 may be wirelessly coupled to a portable radio communication device 110-2 via a direct-mode air interface link (not shown) in accordance with one or more direct-mode air-interface protocols, such as Bluetooth, near field communication (NFC), Infrared Data Association (IrDA), ZigBee, direct-mode land-mobile-radio (LMR), and/or Wi-Fi, as long as the devices are within mutual transmission range of one another.

The wireless access point 120 is a fixed or mobile network device that provides wireless connection services (e.g., internet services) for one or more client devices (e.g., portable radio communication devices 110) that are located within the respective coverage areas (referred to as hotspot areas 130, 140) of the wireless access points 120. In accordance with some embodiments, the wireless access points 120 are implemented in accordance with & FEE (Institute of Electrical and. Electronics Engineers) 802.11 wireless protocol. Each wireless access point 120 is configured to transmit a beacon communication (e.g., IEEE 802.11 periodic beacon) to advertise its services to client devices such as portable radio communication devices 110 that are located within the coverage area 130, 140 of the respective access point. This enables devices to select a target wireless access point, for example, based on the received signal strength, to connect to services advertised by the target wireless access point. In accordance with embodiments, the beacon communications broadcasted by the wireless access points 120 include, among service information, an identifier (also referred to as device identifier) that is uniquely associated with the respective wireless access points 120. The identifier may include a medium access control (MAC) address of the wireless access point 120, network identifier, such as a network name, a service set identifier (SSID), a basic service set identifier (BSSID), an extended service set identifier (ESSID), Internet Protocol (IP) address, another unique identifier, and any combination thereof.

As shown in FIG. 1, the portable radio communication devices 110-1 through 110-4 are shown as located within the hotspot area 130 of the wireless access point 120-1, and the portable radio communication devices 110-3 through 110-6 are shown as located within the hotspot area 140 of the wireless access point 120-2. In accordance with some embodiments, the portable radio communication devices 110 are configured to initiate a scan and receive beacon communications transmitted by one or more of the wireless access points 120. For example, the portable radio communication devices 110-1 through 110-4 that are located within the hotspot area 130 of the wireless access point 120-1 may receive the beacon communication transmitted by the wireless access point 120-1 and similarly, the portable radio communication devices 110-3 through 110-6 that are located within the hotspot area 140 of wireless access point 120-2 may receive the beacon communication transmitted by wireless access point 120-2. Further, the portable radio communication device 110-3 and 110-4 are shown as being located within the hotspot areas 130, 140, respectively of both the wireless access points 120-1, 120-2, and therefore the portable radio communication device 110-3 and 110-4 may receive beacon communication transmitted by both the wireless access points 120-1, 120-2.

Each portable radio communication device 110 participates in a talk group call with other portable radio communication device based on whether the portable radio communication devices are located within a relative proximity to each other. In accordance with embodiments, the relative proximity of any two given portable radio communication devices 110 is determined based on whether the two portable radio communication devices 110 are located in the same hotspot area. In order for each portable radio communication device 110 to securely determine whether other portable radio communication devices are located in the same hotspot area, in accordance with embodiments, each portable radio communication device 110 transmits a hash-value that is generated based on a device identifier of a selected wireless access point (e.g., wireless access point 120-1 from which a signal received by the device 110-1 is associated with a signal strength exceeding a signal strength threshold) to another portable radio communication device 110. The portable radio communication device 110 receiving the hash value compares the received hash value to its own hash value that is generated based on a selected wireless access point to determine whether both the portable radio communication devices 110 are located within a relative proximity to each other and further determine whether to participate in a talk group call with the transmitting portable radio communication device 110 based on the relative proximity.

Figure 2:
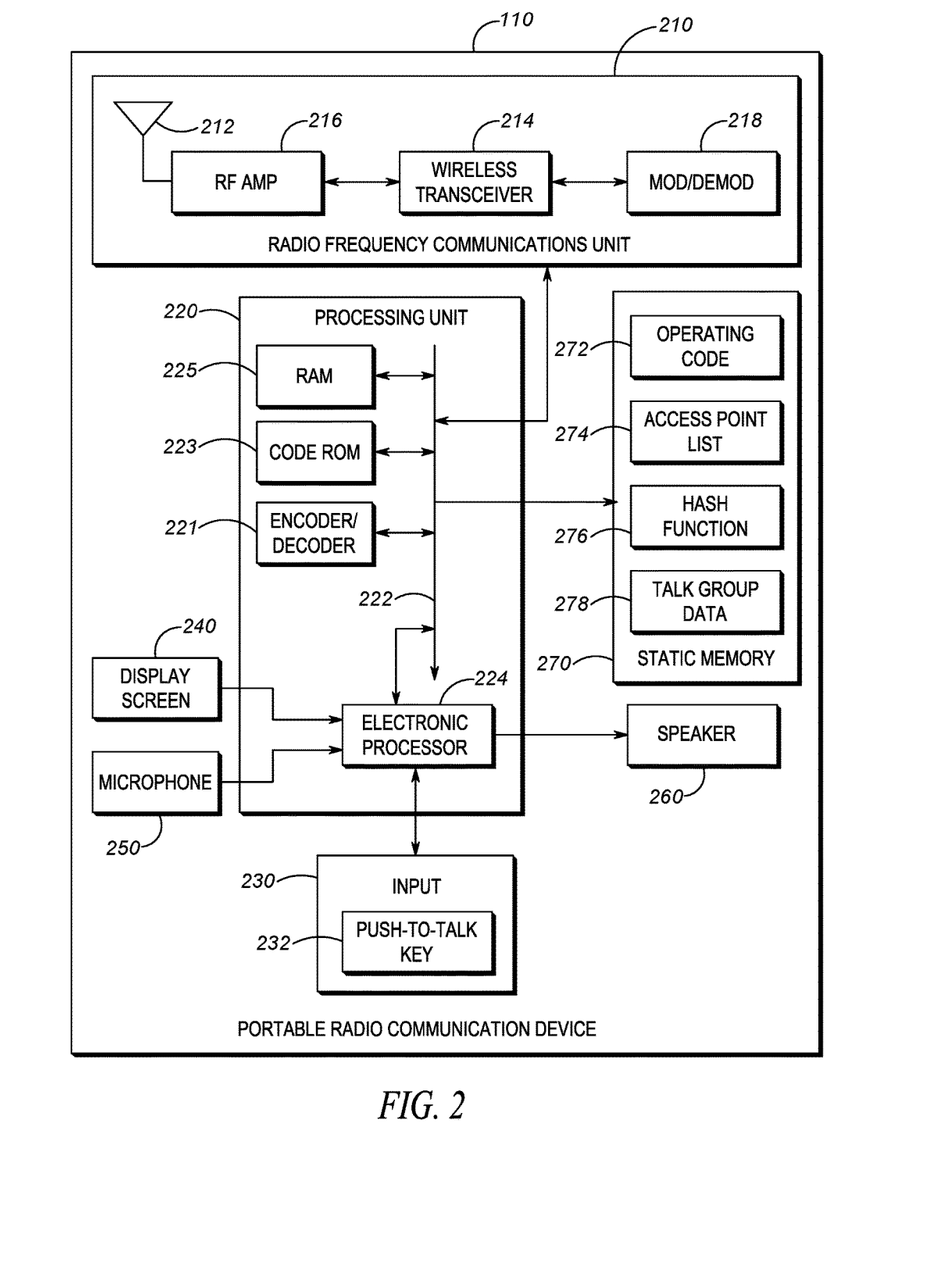
FIG. 2 is a block diagram of a portable radio communication device, in accordance with some embodiments.

FIG. 2 is an example functional block diagram of a portable radio communication device 110 operating within the communication system 100 in accordance with some embodiments. While FIG. 2 represents a portable radio communication device 110 described above with respect to FIG. 1, depending on the type of the portable radio communication device, the portable radio communication device 110 may include fewer or additional components in configurations different from that illustrated in FIG. 2.

As shown in FIG. 2, the portable radio communication device 110 includes a radio frequency communications unit 210 coupled to a common data and address bus 222 of a processing unit 220. The portable radio communication device 110 may also include an input 230 and a display screen 240, each coupled to be in communication with processing unit 220. The input 230 may include an alphanumeric physical keypad (or virtual keypad in cooperation with capacitive touch display screen 240) for inputting text for group communications. The display screen 240 may further function to display group communications received via communications unit 210. A microphone 250 captures audio from a user that is further vocoded by processing unit 220 and transmitted as voice data by communications unit 210 to other communication devices 110 or other devices in system 100. A communications speaker 260 reproduces audio that is decoded from voice data transmissions received from other communication devices via the communications unit 210.

The processing unit 220 may also include an encoder/decoder 221 with an associated code Read Only Memory (ROM) 223 for storing data for initializing system components and encoding and/or decoding voice or other traffic information (including image data, audio data, video data, text data, control signals, etc.) that may be transmitted or received by the portable radio communication device 110. The processing unit 220 may further include an electronic processor 224 coupled, by the common data and address bus 222, to the encoder/decoder 221, a random access memory (RAM) 225, and a static memory 270.

The radio frequency communications unit 210 is a combined receiver and transmitter (e.g., transceiver) having a common antenna 212. The radio frequency communications unit 210 has a transceiver 214 coupled to the antenna 212 via a radio frequency amplifier 216. The transceiver 214 may be a transceiver operating in accordance with one or more standard protocols, such as a digital mobile radio (DMR) transceiver, a Project 25 (P25) transceiver, a terrestrial trunked radio (TETRA) transceiver, a Bluetooth transceiver, a long term evolution (LTE) transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 214 is also coupled to a combined modulator/demodulator (MOD/DEMOD) 218 that is coupled to the encoder/decoder 221.

The electronic processor 224 has ports for coupling to the input 230 and to the display screen 240. The electronic processor 224 further has ports for coupling to the microphone 250 and to the speaker 260. In some embodiments, the static memory 270 may store operating code 272 for the electronic processor 224 that, when executed by the electronic processor 224, perform one or more of the operations set forth in FIGS. 3-5 and accompanying text. Static memory 270 may comprise, for example, a hard disk drive (HDD), an optical disk drives (ODD) such as a compact disk (CD) drive or digital versatile disc (DVD) drive, a solid-state drive (SSD), a tape drive, a flash memory drive, or a tape drive, to name a few.

The static memory 270 stores access point list 274 that includes a list of one or more wireless access points 120 of which the portable radio communication has received a beacon communication transmitted by the respective wireless access point 120. The access point list 274 may further include a device identifier uniquely identifying the respective wireless access points 120 and a signal strength indicator, for example received signal strength indicator (RSSI) associated with signals respectively received from the respective wireless access points 120. In accordance with some embodiments, the access point list 274 may further include a selected wireless access point, where the selected wireless access point corresponds to an access point having the strongest RSSI (or RSSI exceeding the signal strength threshold) among all the other access points in the list. The portable radio communication device 110 updates the access point list 274 (to remove or add wireless access points) when the portable radio communication device 110 moves from one hotspot area to another hotspot area or when the wireless access points 120 are no longer transmitting its beacons communications.

The static memory 270 further stores a hash function 276. In accordance with some embodiments, each portable radio communication device 110 in the communication system 100 may be configured (e.g., during manufacturing) to use the same hash function 276 to generate hash values for comparison. As used herein, the term "hash function" refers to any mathematical function '(Hash_Fn( )' that takes a variable length input string, for example, a device identifier uniquely associated with a wireless access point, and converts it into a fixed length output string, which is called as a hash value. In accordance with some embodiments, the portable radio communication devices 110 may be configured to store a one-way hash function which converts the input string to hash value in one direction, and further makes it computationally difficult for the hash value to be mapped to a particular input string.

Each portable radio communication device 110 also further stores talk group data 278 at the static memory 270. The talk group data 278 includes group subscription information associated with the portable radio communication device 110. The group subscription information includes a group identifier that may identify a talk group to which the portable communication device is registered. In accordance with some embodiments, the portable radio communication device 110 may additionally track or have access to group subscription information that, for each group identifier associated with a particular group of communication devices 110

(e.g., talk group), identifies communication devices (e.g., by a device identifier (ID) such as a hardware ID, hardware Media Access Control (MAC) address, Internet Protocol (IP) address, radio ID, International Mobile Subscriber Identity (IMSI), a serial number, or some other unique identifier that can be used to identify subscribed member communication devices) that are members of the particular group of communication devices 110. The portable communication device 110 that is a member of a particular talk group may be referred herein as a 'talk group member'. While the term "talk group" is used in this description, it will be understood by those of skill in the art that a term such as "communication group" could be used instead, and that the media data being exchanged among the members of the group could be any suitable type of data, such as voice data, image data, video data, and the like.

The input 230 may include a push-to-talk (PTT) key 232 that functions to activate a transmit function in a half or full-duplex communication device, transitioning the portable radio communication device 110 (when activated) from a listen-only mode to a transmit-only mode (for half-duplex communication devices) or transmit and receive mode (for full-duplex communication devices). The PTT key 232 may be a hard mechanical switch set under spring pressure and operated by a finger or hand pressure of a user, or may be a contact switch that is operated by a presence of a grounding element such as a user's finger or hand over or on a surface of the contact switch. In other embodiments, the PTT key 232 may be a soft-switch that is programmed to act as a PTT key at all times or only during certain situations, and may take the form of a geometric shape on a touch-sensitive screen labeled with its function or some other input key or button. Other possibilities exist as well. In accordance with some embodiments, the actuation of PTT key 232 causes the transmission of one or more generated hash values in addition to the PTT call data (i.e., voice communications) from the portable radio communication device 110.

Figure 3:
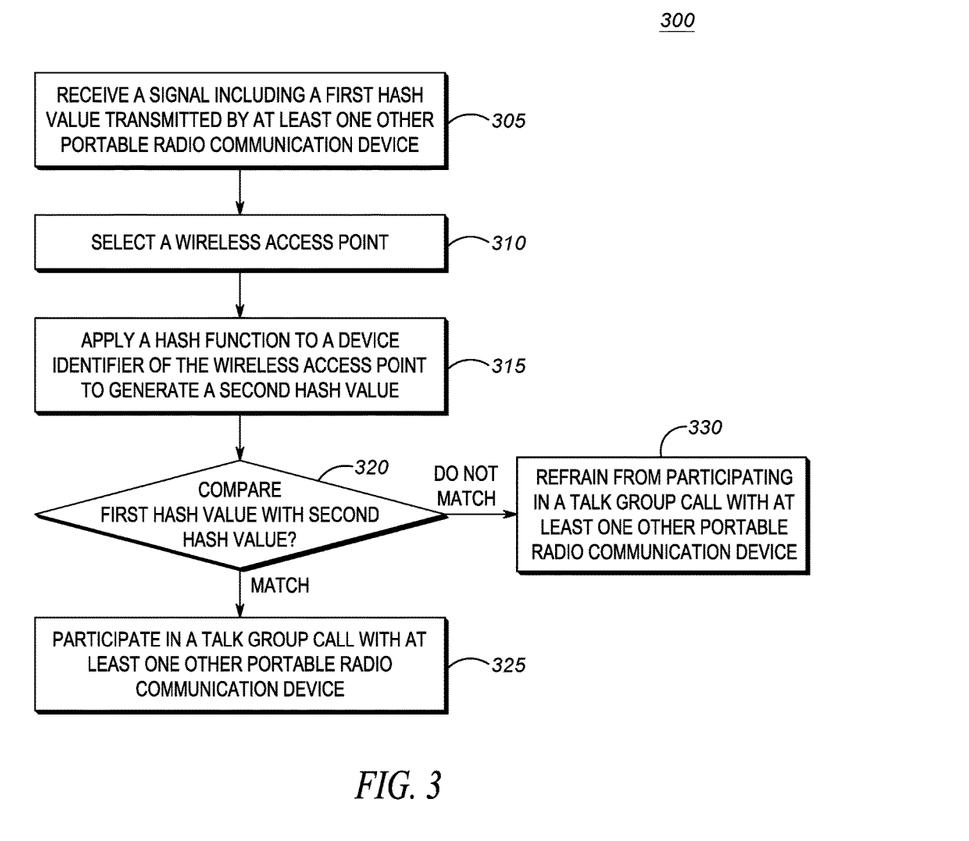
FIG. 3 illustrates a flow chart of a method for controlling a portable radio communication device to participate in a talk group call in accordance with some embodiments.

FIG. 3 illustrates a flow chart diagram of a method 300 of controlling the portable radio communication device 110 to participate in a talk group call. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. The method shown in FIG. 3 can be performed by one or more components, for example, electronic processor 224 of the portable radio communication device 110, and will be described with reference to the functions and components of the system 100.

At block 305, the portable radio communication device 110 receives a signal including a first hash value transmitted by at least one other portable radio communication device. For example, the portable radio communication device 110-1 receives the signal including the first hash value from another portable radio communication device 110-2 via a talk group channel when the device 110-2 initiates a push-to-talk (PTT) transmission with device 110-1 using direct mode of operation. In accordance with some embodiments, each portable radio communication device 110 may be automatically configured to send a signal including the hash value whenever PTT transmission begins (for example, in response to detecting actuation of PTT key 232) at a transmitting portable radio communication device. In some embodiments, the hash value is transmitted prior to the transmissions of PTT signals (e.g., voice communications).

In some embodiments, the hash value is transmitted along with the transmission of PTT signals on the talk group channel. In one example, the first hash value transmitted by the portable radio communication device 110-2 is generated at the portable radio communication device 110-2 by applying a hash function 276 to a device identifier uniquely associated with a wireless access point 120 selected by the device 110-2. For example, since device 110-2 is located in the hotspot area 130 of the wireless access point 120-1, the device 110-2 may select the wireless access point 120-2 for computing the first hash value.

At block 310, the portable radio communication device 110 selects a wireless access point 120 that is within a communication range of the portable radio communication device 110. For example, the portable radio communication device 110-1 may access the access point list 274 stored at the static memory 270 to identify a previously selected wireless access point or alternatively re-select a wireless access point for which the RSSI exceeds a signal strength threshold. When multiple wireless access points are included in the access point list 274 and further when respective RSSIs of multiple wireless access points exceeds the signal strength threshold, the portable radio communication device may randomly select one or more of the wireless access points or alternatively may select a wireless access point having the highest RSSI among the multiple wireless access points. For example, as shown in FIG. 1, since the portable radio communication device 110-1 is located only within the hotspot area 130 of the wireless access point 120-1, the portable radio communication device 110-1 may select the wireless access point 120-1 at block 310.

At block 315, the portable radio communication device 110 applies a hash function 276 to a device identifier that is uniquely associated with the selected wireless access point to generate a second hash value. For example, the portable radio communication device 110-1 generates the second hash value by applying the hash function 276 to the device identifier of the selected wireless access point 120-1.

At block 320, the portable radio communication device 110 compares the first hash value received from the at least one other portable radio communication device with the second hash value generated at the portable radio communication device 110.

At block 325, when the portable radio communication device 110 determines that the first hash value matches with the second hash value, the portable radio communication device 110 participates in the talk group call with the at least one other portable radio communication device. For example, when the first hash value is received from portable radio communication device 110-2, the portable radio communication device 110-1 may establish that the portable radio communication device 110-2 is located in a relative proximity to the portable radio communication device 110-1 based on being located in the same hotspot area (as determined from the matching hash values) and therefore may participate in a talk group call with the device 110-2. The portable radio communication device 110-1 participates in a talk group call by providing, at the portable radio communication device 110-1, an audio or visual output corresponding to the PTT transmission from the at least one other portable radio communication (i.e., device 110-2) on the talk group channel. In one embodiment, when the PTT transmission corresponds to voice communications, the electronic processor 224 unmutes the speaker 260 to provide the audio output corresponding to the received voice communications. This allows the user of the portable radio communication device 110-1 to listen to the voice communications received on the talk group channel. In another embodiment, when the PTT transmission corresponds to a text or multimedia message, the portable radio communication device 110-1 participates in the talk group call by providing, at the portable radio communication device 110-1, a visual notification (e.g., via the electronic display 240) and/or audio notification (e.g., via the speaker 260 by unmuting the speaker 260) corresponding to the PTT transmission.

At block 330, when the portable radio communication device 110 determines that the first hash value does not match with the second hash value, the portable radio communication device 110 refrains from participating in the talk group call with the at least one other portable radio communication device. For example, when the first hash value is received from portable radio communication device 110-5 that is located within the hotspot area 140 of the wireless access point 120-2, the portable radio communication device 110-1 may identify that the portable radio communication device 110-5 is not located in a relative proximity to the portable radio communication device 110-1 based on being located in different hotspot areas (as determined from the hash values not matching with each other) and therefore may refrain from participating in a talk group call with the device 110-5. In one embodiment, the portable radio communication device 110-1 refrains from participating in a talk group call by refraining from generating an audio output corresponding to the voice communications transmitted by the at least one other portable radio communication device (i.e., device 110-5) on the talk group channel. In this embodiment, the electronic processor mutes the speaker 260 or causes the speaker to remain muted such that the user of the portable radio communication device 110-1 will not be able to listen to voice communications transmitted by the portable radio communication device on the talk group channel. In another embodiment, when the PTT transmission corresponds to a text or multimedia message, the portable radio communication device 110-1 refrains from participating in the talk group call by not providing a visual or audio notification at the portable radio communication device 110-1 corresponding to the PTT transmission.

In accordance with some embodiments, a portable radio communication device 110 may transmit and/or receive more than one hash values. For example, the portable radio communication device 110-4 which is shown in FIG. 1 as being located in hotspot areas 120, 130, may transmit two hash values (referred to as the first hash value and a third hash value) each generated from a device identifier respectively associated with the wireless access points 120-1 and 120-2. Therefore, in this case, the portable radio communication device 110-1 receives both the first hash value and third hash value at block 305.

In one embodiment, the portable radio communication device 110 participates in a talk group call with the at least one other portable radio communication device when either the first hash value or third hash value matches with the second hash value generated at block 315. In the example shown in FIG. 1, the portable radio communication device 110-4 is located in the hotspot areas 130, 140 of the wireless access point 120-1, 120-2, whereas the portable radio communication device 110-1 is located in the hotspot area 130 of the wireless access point 120-1, but not the hotspot area 140 of the wireless access point 120-2. Accordingly, the first hash value i.e., hash value generated from the device identifier of the wireless access point 120-1 matches with the second hash value generated at block 315 while the third hash value i.e., hash value generated from the device identifier of the wireless access point 120-2 does not match with the second hash value generated at block 315. Accordingly, in this example, the portable radio communication device 110-1 participates in the talk group call with portable radio communication device 110-2 because the first hash value i.e., hash value generated from the device identifier of the wireless access point 120-1 matches with the second hash value.

In another embodiment, a portable radio communication device 110 participates in a talk group with at least one other portable radio communication device only when the at least one other portable radio communication device is located in a predetermined number (e.g., more than two) of same hotspot areas. As shown in FIG. 1, portable radio communication devices 110-3 and 110-4 are located in the hotspot areas 130, 140 of the wireless access point 120-1, 120-2. For example, when portable radio communication device 110-3 initiates PTT transmission with portable radio communication device 110-4, the portable radio communication device 110-3 sends two hash values i.e., a first hash value generated by applying a hash function to a device identifier of the wireless access point 120-1 and a third hash value generated by applying a hash function to a device identifier of the wireless access point 120-2. When the portable radio communication device 110-4 receives the two hash values at block 305, the portable radio communication device 110-4 may select the wireless access points that are within the communication range of the portable radio communication device 110-4. In the example shown in FIG. 1, the portable radio communication device 110-4 is located within the hotspot areas 130, 140 of the respective wireless access points 120-1, 120-2, and therefore may select the wireless access points 120-1, 120-2 at block 310. Next at block 315, the portable radio communication device 110-4 applies the hash function to a device identifier of the wireless access point 120-1 to generate a second hash value and further applies the hash function to a device identifier of the wireless access point 120-2 to generate a fourth hash value. The portable radio communication device 110-4, then at block 320 compares the first and third hash values received from portable radio communication device 110-3 with each one of the second and fourth hash values generated at the portable radio communication device 110-4. The portable radio communication device 110-4 participates in a talk group call with the portable radio communication device 110-3 because the first and third hash values respectively matches with one of the second and fourth hash values.

Figure 4:
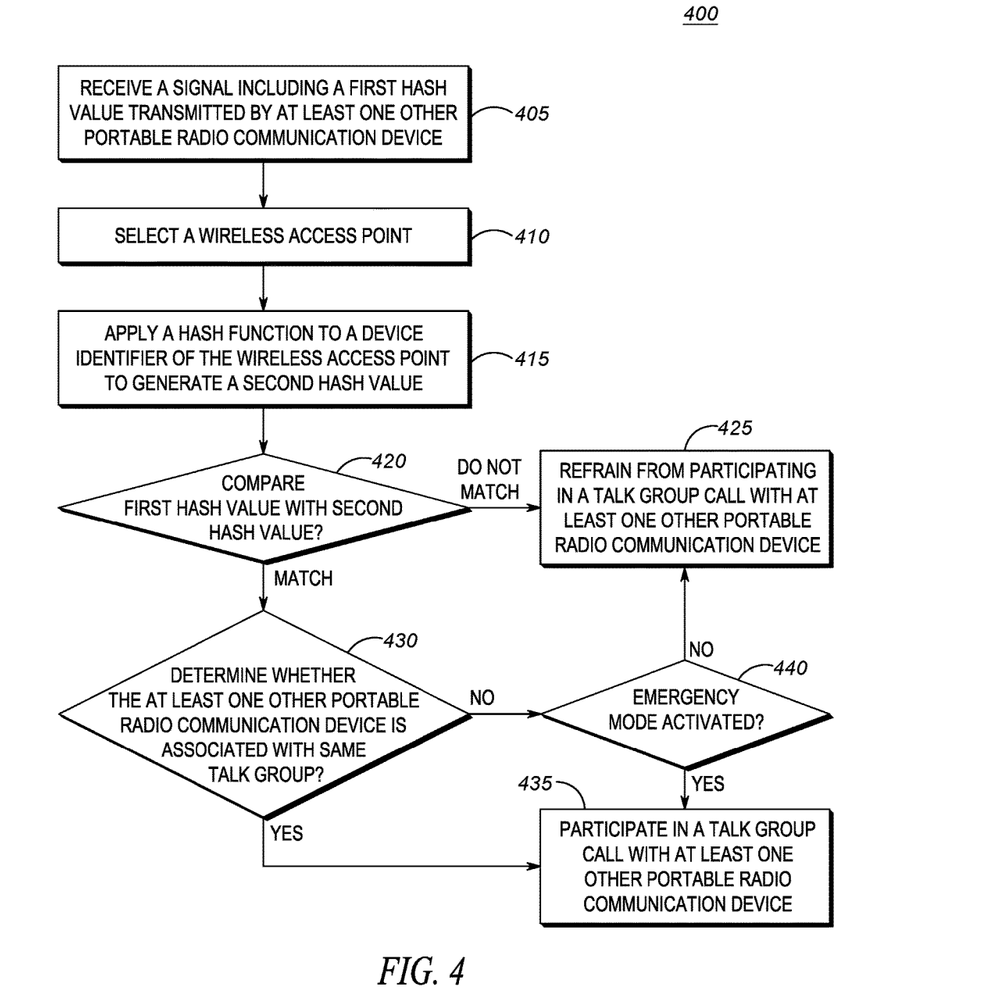
FIG. 4 illustrates a flowchart of a method for controlling a portable radio communication device to participate in a talk group call in accordance with some embodiments.

FIG. 4 illustrates a flow chart diagram of a method 400 of controlling the portable radio communication device 110 to participate in a talk group call. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. The method shown in FIG. 4 can be performed by one or more components, for example, electronic processor 224 of the portable radio communication device 110, and will be described with reference to the functions and components of the system 100.

At block 405, the portable radio communication device 110 receives a signal including a first hash value transmitted by at least one other portable radio communication device. For example, the portable radio communication device 110-1 receives the signal including the first hash value from another portable radio communication device 110-2 via a talk group channel when the device 110-2 initiates a push-to-talk (PTT) transmission with device 110-1 using direct mode of operation. In accordance with some embodiments, each portable radio communication device 110 may be automatically configured to send a hash value whenever a PTT transmission is activated (for example, via actuation of PTT key 232) by a transmitting portable radio communication device. In some embodiments, the hash value is transmitted prior to the transmissions of PTT signals (e.g., voice communications). In some embodiments, the hash value is transmitted along with the transmission of PTT signals on the talk group channel. In one example, the first hash value transmitted by the portable radio communication device 110-2 is generated at the portable radio communication device 110-2 by applying a hash function 276 to a device identifier uniquely associated with a wireless access point selected by the device 110-2. Since device 110-2 is located in the hotspot area 130 of the wireless access point 120-1, the device 110-2 may select the wireless access point 120-2 for purposes of computing the first hash value.

At block 410, the portable radio communication device 110 selects a wireless access point 120 that is within a communication range of the portable radio communication device 110. For example, the portable radio communication device 110-1 may access the access point list 274 stored at the static memory 270 to identify a previously selected wireless access point or alternatively re-select a wireless access point for which the RSSI exceeds a signal strength threshold. When multiple wireless access points are included in the access point list 274 and further when respective RSSIs of multiple wireless access points 120 exceeds the signal strength threshold, the portable radio communication device 110 may randomly select one or more of the wireless access points 120 or alternatively may select a wireless access point 120 having the highest RSSI among the multiple wireless access points. For example, as shown in FIG. 1, since the portable radio communication device 110-1 is located only within the hotspot area 130 of the wireless access point 120-1, the portable radio communication device 110-1 may select the wireless access point 120-1 at block 310.

At block 415, the portable radio communication device 110 applies a hash function 276 to a device identifier that is uniquely associated with the selected wireless access point to generate a second hash value. For example, the portable radio communication device 110-1 generates the second hash value by applying the hash function 276 to the device identifier of the selected wireless access point 120-1.

At block 420, the portable radio communication device 110 compares the first hash value received from the at least one other portable radio communication device with the second hash value generated at the portable radio communication device 110.

At block 425, when the portable radio communication device 110 determines that the first hash value does not match with the second hash value, the portable radio communication device 110 refrains from participating in the talk group call with the at least one other portable radio communication device. For example, when the first hash value is received from portable radio communication device 110-5 that is located within the hotspot area 140 of the wireless access point 120-2, the portable radio communication device 110-1 may identify that the portable radio communication device 110-5 is not located in a relative proximity to the portable radio communication device 110-1 based on being located in different hotspot areas (as determined from the hash values not matching with each other) and therefore may refrain from participating in a talk group call with the device 110-5. The portable radio communication device 110-1 refrains from participating in a talk group call by refraining from generating an audio or visual output corresponding to the PTT transmissions from the other portable radio communication device (i.e., device 110-5) on the talk group channel. In one embodiment, the electronic processor 224 mutes the speaker 260 or causes the speaker to remain muted such that the user of the portable radio communication device 110-1 will not be able to listen to voice communications transmitted by the portable radio communication device on the talk group channel.

At block 430, when the portable radio communication device 110 determines that the first hash value matches with the second hash value, the portable radio communication device 110 further determines whether the at one least one other portable radio communication device is associated with same talk group. For example, when the first hash value is received from portable radio communication device 110-2, the portable radio communication device 110-1 may identify that the portable radio communication device 110-2 is located in a relative proximity to the portable radio communication device 110-1 based on being located in the same hotspot area (as determined from the matching hash values). However, in this embodiment, the portable radio communication device 110-1 further checks whether a proximately located portable radio communication device 110-2 is also associated with the same talk group as the portable radio communication device 110-1 prior to participating in a talk group call with the portable radio communication device 110-2.

In one embodiment, the portable radio communication device 110 further receives a group identifier associated with the at least one other portable radio communication device when it receives the signal along with the first hash value from the at least one other portable radio communication device. The portable radio communication device 110 then compares the received group identifier with a group identifier included in the talk group data 278 stored at the memory 270 to check whether both the radio devices 110 are associated with same talk group.

At block 435, when the portable radio communication device 110 determines that the least one other portable radio communication device is associated with same talk group, the portable radio communication device 110 participates in the talk group call with the at least one other portable radio communication device. The portable radio communication device 110-1 participates in a talk group call by providing, at the portable radio communication device 110-1, an audio or visual output corresponding to PTT transmission from the at least one other portable radio communication device (i.e., device 110-2) on the talk group channel. In one embodiment, when the PTT transmission corresponds to voice communications, the electronic processor unmutes the speaker 260 to provide the audio output corresponding to the received voice communications. This allows the user of the portable radio communication device to listen to the voice communications received on the talk group channel. In another embodiment, when the PTT transmission corresponds to a text or multimedia message, the portable radio communication device 110-1 refrains from participating in the talk group call by not providing a visual or audio notification at the portable radio communication device 110-1 corresponding to the PTT transmission.

At block 440, when the portable radio communication device 110 determines that the at least one portable radio communication device is not associated with the same talk group, the portable radio communication device 110 determines whether an emergency mode is activated at the portable radio communication device 110. The emergency mode may be activated at the portable communication device 110 based on one or more of: an emergency signal received from a command center such as computer aided dispatch (CAD) center such as in the form of incident assignment, based on a location of the portable radio communication device 110 relative to a location of an incident scene, or based on other user context as detected from sensors such as a man down situation, and the like. In accordance with some embodiments, the emergency mode may be activated at the portable radio communication device 110 based on an emergency indication that is transmitted along with the hash value from the at least one other portable radio communication device when the at least one other portable radio communication device initiates PTT transmission by actuating an emergency PTT key that may be dedicated for the purposes of initiating emergency communication.

When the portable radio communication device 110 determines that an emergency mode has been activated at the portable radio communication device 110, the portable radio communication device 110 participates in a talk group call as shown in block 435 even if the at least one other portable radio communication device is not associated with the same talk group. This allows two proximately located public safety personnel (e.g., firefighters dealing with fire in different rooms of a building) to listen to each other's communications via their respective communication devices even if they are not member of the same talk group.

Alternatively, if no emergency mode has been activated at the portable communication device and if the at least one other portable radio communication device is not associated with same talk group, then the portable radio communication device 110 refrains from participating in the talk group call with the at least one other portable radio communication device as shown in block 425. This mechanism ensures that only proximately located portable radio communication devices that are associated with the same talk group are able to listen to or notified of each other's communications.

Figure 5:
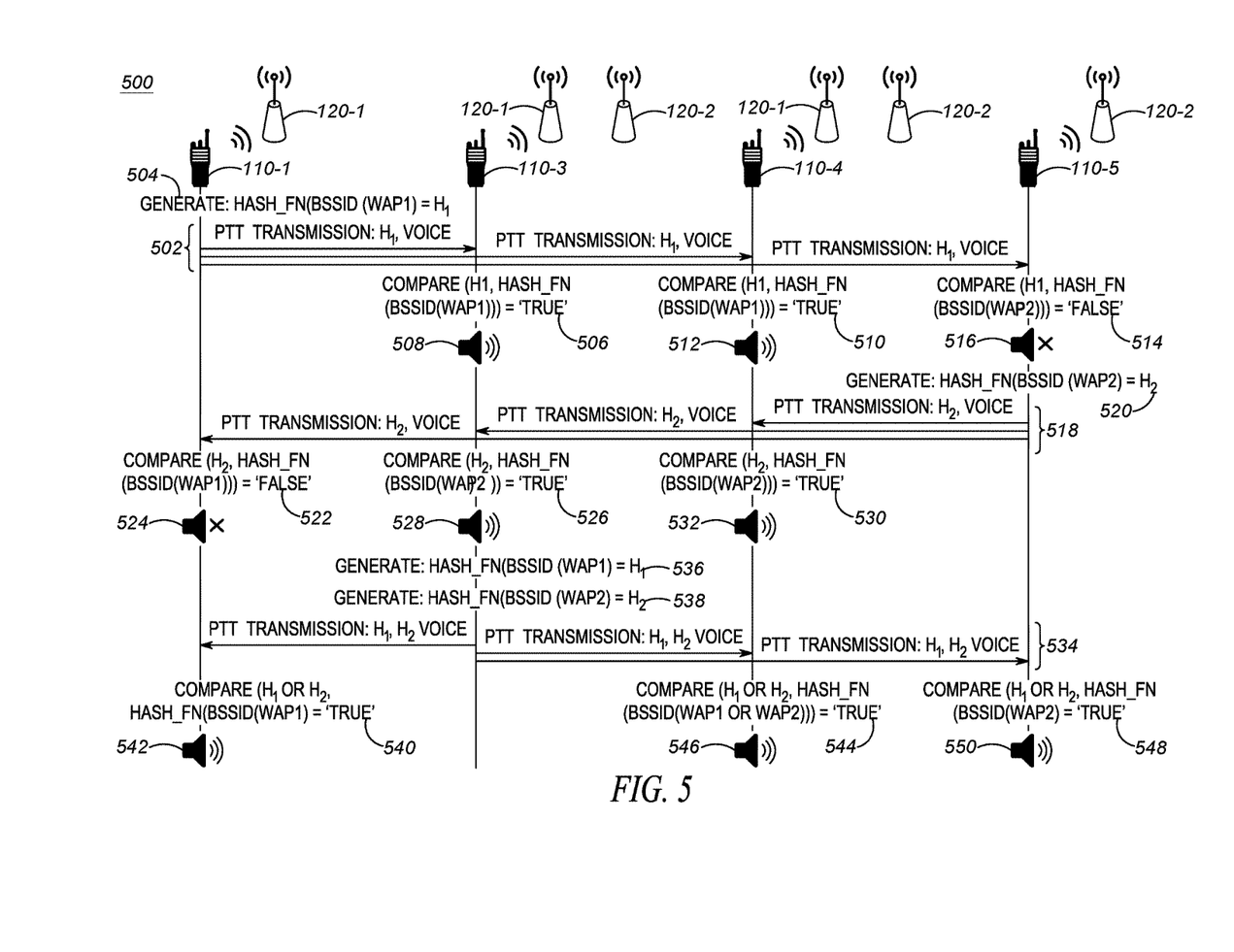
FIG. 5 illustrates a communication flow diagram illustrating the method of controlling the portable radio communication devices to participate in a talk group call in accordance with some embodiments.

FIG. 5 illustrates a communication flow diagram 500 of a method for controlling the portable radio communication devices 110 to participate in a talk group call. Similar to the example shown in FIG. 1, in FIG. 5, the portable communication devices 110-1 and 110-5 are shown as located near (i.e., within a given hotspot area) the wireless access point 120-1 (WAP1) and wireless access point 120-2 (WAP2), and the portable communication devices 110-3 and 110-4 are shown as located near (i.e., within a given hotspot area) the wireless access points 120-1 (WAP1) and 120-2 (WAP2).

The portable communication device 110-1 sends a PTT transmission 502, for example, on a talk group channel. For example, when a user of the portable radio communication device 110-1 presses the PTT key 232, the PTT transmission 502 is automatically initiated using a selected frequency channel. In accordance with some embodiments, the portable radio communication device 110-1, prior to sending the PTT transmission 502, generates a hash value 'H$_1$' 504 by applying a hash function to a device identifier (for example, BSSID) of the WAP1 120-1. The PTT transmission 502 includes both the hash value 'H$_1$' 504 as well as voice (or data) communications originating from the portable radio communication device 110-1. In some embodiments, the hash value 'H$_1$' 504 is transmitted prior to the transmission of voice communications on the talk group channel.

In the example shown in FIG. 5, the portable radio communication devices 110-3, 110-4, and 110-5 which is monitoring the talk group channel receives the PTT transmission 502. In accordance with some embodiments, the portable radio communication devices 110-3, 110-4, 110-5 first determine if the portable radio communication device 110-1 sending the PTT transmission is proximately located, prior to providing audio output (for example, by unmuting the speaker 260) corresponding to the received voice communications. The determination of whether the transmitting portable radio communication device 110-1 is proximately located is respectively performed at each of the receiving portable radio communication devices 110-3, 110-4, and 110-5.

The portable radio communication device 110-3 compares the received hash value 'H$_1$' 504 with a hash value that is generated based on applying the hash function 'Hash_Fn( )' to a device identifier (e.g., BSSID) of a selected access point (i.e., WAP1 120-1). In other words, the portable radio communication device 110-3 compares 'H$_1$' 504 with the output value of Hash_Fn(BSSID(WAP1)). In this example, since the portable radio communication device 110-1 and portable radio communication device 110-3 are located within the same hotspot area 130, the comparison results in 'TRUE' 506 i.e., the hash value 'H$_1$' matches with the output value of Hash_Fn(BSSID(WAP1)). Accordingly, the portable radio communication device 110-3 unmutes 508 its speaker 260 to provide an audio output corresponding to the voice communications received via the PTT transmission 502.

Similarly, the portable radio communication device 110-4 compares the received hash value 'H$_1$' 504 with a hash value that is generated based on applying the hash function 'Hash_Fn( )' to a device identifier (e.g., BSSID) of a selected access point (i.e. WAP2 120-1). In other words, the portable radio communication device 110-3 compares 'H$_1$' with the output value of Hash_Fn(BSSID(WAP1)). In this example, since the portable radio communication device 110-1 and portable communication device 110-4 are located within the same hotspot area, the comparison results in 'TRUE' 510 i.e., the hash value 'H$_1$' matches with the output value of Hash_Fn(BSSID(WAP1)). Accordingly, the portable radio communication device 110-4 unmutes 512 its speaker 260 to provide an audio output corresponding to the voice communications received via the PTT transmission 502.

Similarly, the portable radio communication device 110-5 compares the received hash value 'H$_1$' 504 with a hash value that is generated based on applying the hash function 'Hash_Fn( )' to a device identifier (e.g., BSSID) of a selected access point (i.e., WAP2 120-2). In other words, the portable radio communication device 110-3 compares 'H$_1$' with the output value of Hash_Fn(BSSID(WAP2)). In this example, since the portable radio communication device 110-1 and portable radio communication device 110-4 are not located within the same hotspot area, the comparison results in 'FALSE' 514 i.e., the hash value 'H$_1$' does not match with the output value of Hash_Fn(BSSID(WAP2)). Accordingly, the portable radio communication device 110-4 mutes 516 its speaker 260 so as to refrain from providing an audio output corresponding to the voice communications received via the PTT transmission 502.

In the communication flow diagram 500, the portable radio communication device 110-5 is also shown as sending a PTT transmission 518 that is received by portable radio communication devices 110-1, 110-3, and 110-4. In accordance with some embodiments, the portable radio communication device 110-5, prior to sending the PTT transmission 518, generates a hash value 'H$_2$' 520 by applying a hash function to a device identifier (for example, BSSID) of the WAP2 120-2. The PTT transmission 518 includes both the hash value 'H$_2$' 520 as well as voice (or data) communications originating from the portable radio communication device 110-5. In some embodiments, the hash value 'H$_2$' 520 is transmitted prior to the transmission of voice communications on the talk group channel.

In the example shown in FIG. 5, the portable radio communication devices 110-1, 110-3, and 110-4 which is monitoring the talk group channel receives the PTT transmission 518. In accordance with some embodiments, the portable radio communication devices 110-1, 110-3, 110-4 first determine if the portable radio communication device 110-5 sending the PTT transmission is proximately located prior to providing an audio output (by unmuting the speaker) corresponding to the received voice communications. The determination of whether the transmitting portable radio communication device 110-5 is proximately located is respectively performed at each of the receiving portable radio communication devices 110-1, 110-3, and 110-4.

The portable radio communication device 110-1 compares the received hash value 'H$_2$' 520 with a hash value that is generated based on applying the hash function 'Hash_Fn( )' to a device identifier (e.g., BSSID) of a selected access point (i.e., WAP1 120-1). In other words, the portable radio communication device 110-1 compares 'H$_1$' with the output value of Hash_Fn(BSSID(WAP1)). In this example, since the portable radio communication device 110-1 and portable radio communication device 110-5 are not located within the same hotspot area, the comparison results in 'FALSE' 522 i.e., the hash value 'H$_2$' does not match with the output value of Hash_Fn(BSSID(WAP1)). Accordingly, the portable radio communication device 110-1 mutes 524 the speaker 260 so as to refrain from providing an audio output corresponding to the voice communications received via the PTT transmission 502.

Similarly, the portable radio communication device 110-3 compares the received hash value 'H$_2$' 504 with a hash value that is generated based on applying the hash function 'Hash_Fn( )' to a device identifier (e.g., BSSID) of a selected access point (i.e., WAP2 120-2). In other words, the portable radio communication device 110-3 compares 'H$_2$' with the output value of Hash_Fn(BSSID(WAP2)). In this example, since the portable radio communication device 110-1 and portable communication device 110-3 are located within the same hotspot area, the comparison results in 'TRUE' 526 i.e., the hash value 'H$_2$' matches with the output value of Hash_Fn(BSSID(WAP2)). Accordingly, the portable radio communication device 110-3 unmutes 528 the speaker 260 to provide an audio output corresponding to the voice communications received via the PTT transmission 502.

Similarly, the portable radio communication device 110-4 compares the received hash value 'H$_2$' 504 with a hash value that is generated based on applying the hash function 'Hash_Fn( )' to a device identifier (e.g., BSSID) of a selected access point (i.e., WAP2 120-2). In other words, the portable radio communication device 110-4 compares 'H$_2$' with the output value of Hash_Fn(BSSID(WAP2)). In this example, since the portable radio communication device 110-1 and portable communication device 110-4 are located within the same hotspot area, the comparison results in 'TRUE' 530 i.e., the hash value 'H$_2$' matches with the output value of Hash_Fn(BSSID(WAP2)). Accordingly, the portable radio communication device 110-3 unmutes 532 the speaker 260 to provide an audio output corresponding to the voice communications received via the PTT transmission 502.

In the communication flow diagram 500, the portable radio communication device 110-3 is also shown as sending a PTT transmission 534 that is received by portable radio communication devices 110-1, 110-4, and 110-5. In accordance with some embodiments, the portable radio communication device 110-3, prior to sending the PTT transmission 518, generates two hash values 'H$_1$' 536 and 'H$_2$' 538, by applying a hash function to a device identifier (for example, BSSID) of the selected wireless access points, WAP1 120-1 and WAP2 120-2, respectively. The PTT transmission 518 includes both the hash values 'H$_1$' 536 and 'H$_2$' 538, as well as voice (or data) communications originating from the portable radio communication device 110-3. In some embodiments, the hash values 'H$_1$' 536 and 'H$_2$' 538 are transmitted prior to the transmission of voice communications on the talk group channel.

In the example shown in FIG. 5, the portable radio communication devices 110-1, 110-4, and 110-5 which is monitoring the talk group channel receives the PTT transmission 534. In accordance with some embodiments, the portable radio communication devices 110-1, 110-4, 110-5 first determines if the portable radio communication device 110-3 sending the PTT transmission is proximately located prior to providing an audio output (by unmuting the speaker) corresponding to the received voice communications. The determination of whether the transmitting portable radio communication device 110-3 is proximately located is respectively performed at each of the receiving portable radio communication devices 110-1, 110-4, and 110-5.

The portable radio communication device 110-1 compares the received hash values 'H$_1$' 536 and 'H$_2$' 538 with a hash value that is generated based on applying the hash function 'Hash_Fn( )' to a device identifier (e.g., BSSID) of a selected access point (i.e., WAP1 120-1). In other words, the portable radio communication device 110-3 compares if one of the hash values 'H$_1$' or 'H$_2$' matches with the output value of Hash_Fn(BSSID(WAP1)). In this example, since the portable radio communication device 110-1 and portable radio communication device 110-3 are located within the hotspot area of the wireless access point, WAP1 120-1, the comparison results in 'TRUE' 540 i.e., the hash value 'H$_1$' matches with the output value of Hash_Fn(BSSID(WAP1)). Accordingly, the portable radio communication device 110-1 unmutes 542 the speaker 260 so as to provide an audio output corresponding to the voice communications received via the PTT transmission 534.

Similarly, the portable radio communication device 110-4 compares the received hash values 'H$_1$' 536 and 'H$_2$' 538 with hash values that are generated based on applying the hash function 'Hash_Fn( )' to a device identifier (e.g., BSSID) of the selected access points, WAP1 120-1, WAP2 120-2, respectively. In other words, the portable radio communication device 110-3 compares if one of the hash values 'H$_1$' or 'H$_2$' matches with one of the output values of Hash_Fn(BSSID(WAP1)) or Hash_Fn(BSSID(WAP2)). In this example, since the portable radio communication device 110-3 and portable communication device 110-4 are located in hotspot areas of both wireless access points WAP1 120-1 and WAP2 120-2, the comparison results in 'TRUE' 544 i.e., the hash values 'H$_1$' and 'H$_2$' respectively match with the output values of Hash_Fn(BSSID(WAP1)) and Hash_Fn(BSSID(WAP2)). Accordingly, the portable radio communication device 110-3 unmutes 546 its speaker 260 to provide an audio output corresponding to the voice communications received via the PTT transmission 534.

The portable radio communication device 110-5 compares the received hash values 'H$_1$' 536 and 'H$_2$' 538 with a hash value that is generated based on applying the hash function 'Hash_Fn( )' to a device identifier (e.g., BSSID) of a selected access point (i.e., WAP2 120-2). In other words, the portable radio communication device 110-5 compares if one of the hash values '$H_1$' or '$H_2$' matches with the output value of Hash_Fn(BSSID(WAP2)). In this example, since the portable radio communication device 110-3 and portable radio communication device 110-5 are located within the hotspot area of the wireless access point, WAP2 120-2, the comparison results in 'TRUE' 548 i.e., the hash value '$H_2$' matches with the output value of Hash_Fn(BSSID(WAP2)). Accordingly, the portable radio communication device 110-5 unmutes 550 the speaker 260 so as to provide an audio output corresponding to the voice communications received via the PTT transmission 534.

In accordance with embodiments, system and methods described herein can be advantageously implemented in radio communication systems in which location determination is not possible for the radios either due to lack of a central server or such location determination or sharing is disabled at the radios. The system and methods described herein allow radios to participate in a talk group call with other radios based on a determination that the radios are proximately located to each other which itself is determined based on whether the radios are located within one or more common hotspot areas. By automatically embedding a hash value representation of the wireless access point within the PTT transmissions, embodiments of the disclosure allow the radios to securely establish their proximity with other radios. The embedding of hash values within the PTT transmissions also eliminate the need for radios to exchange additional messages with each other to establish their proximity, thereby reducing the messaging overhead.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of controlling a portable radio communication device to participate in a talk group call, the method comprising:

receiving, at the portable radio communication device, a signal including a first hash value transmitted by at least one other portable radio communication device;

selecting a wireless access point that is within a communication range of the portable radio communication device;

applying a hash function to a device identifier that is uniquely associated with the wireless access point to generate a second hash value;

comparing the first hash value with the second hash value; and controlling the portable radio communication device to participate in a talk group call with the at least one other portable radio communication device when the first hash value matches with the second hash value.

2. The method of claim 1, wherein the signal is received on a talk group channel assigned for the talk group call, and further wherein the signal includes voice communications transmitted by the at least one other portable radio communication device on the talk group channel, wherein controlling comprises:

causing the portable radio communication device to provide an audio output corresponding to the voice communications when the first hash value matches with the second hash value.

3. The method of claim 2, wherein causing comprises:
unmuting a speaker at the portable radio communication device to provide the audio output.

4. The method of claim 1, wherein the first hash value is generated at the at least one other portable radio communication device as a function of a device identifier that is uniquely associated with a wireless access point selected by the at least one other portable communication device.

5. The method of claim 1, further comprising:
controlling the portable radio communication device to refrain from participating in the talk group call with the at least one other portable radio communication device when the first hash value does not match with the second hash value.

6. The method of claim 5, wherein the signal is received on a talk group channel assigned for the talk group call, and further wherein the signal further includes voice communications transmitted by the at least one other portable radio communication device on the talk group channel, wherein controlling comprises:

causing the portable radio communication device to refrain from generating an audio output corresponding to the voice communications when the first hash value does not match with the second hash value.

7. The method of claim 6, wherein causing comprises:
muting a speaker at the portable radio communication device.

8. The method of claim 1, wherein controlling comprises:
determining whether the portable radio communication device and the at least one other portable radio communication device are associated with same talk group; and controlling the portable radio communication device to participate in the talk group call with the at least one other portable radio communication device when the first hash value matches with the second hash value and when the portable radio communication device and the at least one other portable radio communication device are associated with the same talk group.

9. The method of claim 1, wherein controlling comprises:
determining whether the portable radio communication device and the at least one other portable radio communication device are associated with same talk group;

determining whether an emergency mode is activated at the portable radio communication device when the portable radio communication device and the at least one other portable radio communication device are not associated with same talk group; and controlling the portable radio communication device to participate in the talk group call with the at least one other portable radio communication device when the first hash value matches with the second hash value and when the emergency mode is activated at the portable radio communication device.

10. The method of claim 9, further comprising:
controlling the portable radio communication device to not participate in the talk group call with the at least one other portable radio communication device when the first hash value matches with the second hash value and when the emergency mode is not activated at the portable radio communication device.

11. The method of claim 1, wherein selecting comprises:
determining that a signal strength associated with a signal received at the portable radio communication device from the wireless access point exceeds a signal strength threshold.

12. The method of claim 1, wherein the signal comprises a third hash value transmitted by the at least one other portable radio communication device, the method further comprising:

controlling the portable radio communication device to participate in a talk group call with the at least one other portable radio communication device when the first hash value or third hash value matches with the second hash value.

13. The method of claim 1, wherein the signal comprises a third hash value transmitted by the at least one other portable radio communication device, the method further comprising:

selecting at least one other wireless access point from a plurality of wireless access points that are within the communication range of the portable radio communication device;

applying the hash function to a second device identifier that is uniquely associated with the at least one other wireless access point to generate a fourth hash value;

comparing the first and third hash values with each one of the second and fourth hash values; and controlling the portable radio communication device to participate in the talk group call with the at least one other portable radio communication device when the first and third hash values respectively matches with one of the second and fourth hash values.

14. The method of claim 1, further comprising:
detecting that a push-to-talk (PTT) key is actuated at the portable radio communication device; and in response to the detection, transmitting the second hash value to one or more other portable radio communication devices to enable the one or more other portable radio communication devices to determine whether to participate in a talk group call with the portable radio communication device based on a comparison of the second hash value with hash values respectively generated at the one or more other portable radio communication devices.

15. A portable radio communication device, comprising:
a wireless transceiver; and
an electronic processor communicatively coupled to the wireless transceiver, the electronic processor configured to:
receive, via the wireless transceiver, a signal including a first hash value transmitted by at least one other portable radio communication device;
select a wireless access point from a plurality of wireless access points that are within a communication range of the portable radio communication device;
apply a hash function to a device identifier that is uniquely associated with the wireless access point to generate a second hash value;
compare the first hash value with the second hash value; and
control the portable radio communication device to participate in a talk group call with the at least one other portable radio communication device when the first hash value matches with the second hash value.

16. The portable radio communication device of claim 15, wherein the signal is received on a talk group channel assigned for the talk group call, and further wherein the signal further includes voice communications transmitted by the at least one other portable radio communication device on the talk group channel, the device further comprising:
a speaker communicatively coupled to the electronic processor, wherein the electronic processor is configured to unmute the speaker to provide an audio output corresponding to the voice communications when the first hash value matches with the second hash value.

17. The portable radio communication device of claim 15, wherein the electronic processor is configured to:
control the portable radio communication device to not participate in the talk group call with the at least one other portable radio communication device when the first hash value does not match with the second hash value.

18. The portable radio communication device of claim 17, further comprising a speaker communicatively coupled to the electronic processor, wherein the electronic processor is configured to mute the speaker when the first hash value does not match with the second hash value.

19. The portable radio communication device of claim 15, wherein the electronic processor is configured to:
determine whether the portable radio communication device and the at least one other portable radio communication device are associated with same talk group; and
control the portable radio communication device to participate in the talk group call with the at least one other portable radio communication device when the first hash value matches with the second hash value and when the portable radio communication device and at least one other portable radio communication device are associated with the same talk group; and
control the portable radio communication device to not participate in the talk group call with the at least one other portable radio communication device when the first hash value matches with the second hash value and when the portable radio communication device and at least one other portable radio communication device are not associated with the same talk group.

20. The portable radio communication device of claim 15, further comprising a push-to-talk (PTT) interface communicatively coupled to the electronic processor, wherein the electronic processor is configured to:
detect an actuation of the push-to-talk (PTT) interface; and
cause the wireless transceiver to transmit the second hash value to one or more other portable radio communication devices to enable the one or more other portable radio communication devices to determine whether to participate in a talk group call with the portable radio communication device based on comparing the second hash value with hash values respectively generated at the one or more other portable radio communication devices.

* * * * *